United States Patent Office 2,798,039
Patented July 2, 1957

2,798,039
ELECTROLYTIC PRODUCTION OF TITANIUM DICHLORIDE

Yoshikame Inoue and Kaichiro Takeuchi, Kobe, Kazumi Fukuda, Higashi-Kanki-mura, Innami-gun, Hyogo-ken, and Hidekichi Miyawaki, Tokyo, Japan No Drawing. Application August 3, 1955,
Serial No. 526,316

Claims priority, application Japan August 4, 1954

9 Claims. (Cl. 204—94)

The present invention relates to improvements in and relating to a method for the production of a lower chloride of titanium from the tetrachloride.

It has been commonly known that titanium dichloride is heated in an inert gas atmosphere and under vacuum to metal titanium and titanium tetrachloride, in order to obtain the metal by separating the thus produced tetrachloride by evaporation. On the other hand, however, it has not been hitherto known to obtain titanium dichloride from titanium tetrachloride, one of the commonly available industrial materials, in an economical manner. In addition, normally obtainable titanium dichloride, except that synthetically produced from metal titanium and titanium tetrachloride, suffers from impurities contained therein. This is attributable to the fact that the purity of the basic metal used for the reduction of the tetrachloride influences to a high degree the purity of the produced dichloride and that the high temperature necessary for the reaction affects adversely the purity of the dichloride, which is highly active at elevated temperatures.

It has been also known to reduce titanium tetrachloride by means of hydrogen gas. It is, however, very difficult to remove the water content from the hydrogen gas. In addition, as the material of the reaction vessel it is necessary to employ a special material stable against the possible attack by the hydrogen chloride gas at elevated temperatures as well as against that caused by the titanium dichloride, which is highly active at higher temperatures as already explained.

It is, therefore, an object of the invention to provide a method, according to which titanium dichloride from the tetrachloride may be produced in a more economical and simple manner than in known processes.

It is another object of the invention to provide a novel method, according to which pure titanium dichloride is produced at exceedingly lower operating temperatures.

These and other objects are realized, when according to this invention, titanium tetrachloride is directly reacted with dry ammonia gas, the reaction products are dissolved in water and the thick aqueous solution is treated by electrolysis to lower chlorides, which are finally distilled under diminished pressure to expel the ammonia and water for the purpose of obtaining pure titanium dichloride. Instead of the direct reaction of the tetrachloride with dry ammonia gas, the similar operation may be, according to another feature of the invention, carried out in the presence of an inert and non-water-soluble solvent or mixture of solvents. The ammonia to react with should include the least possible water content. The reaction temperature to react titanium tetrachloride with dry ammonia gas should be controlled to be less than 65° C., in order to avoid the formation of the dark brown nitride.

When the electrolytic conditions are properly adjusted in the above process, the reaction solution may contain separated or dissolved ammonia compounds of titanium mono- and trichloride, instead of the dichloride desired. These ammonia compounds are, however, of relatively less use in the industry and, in addition, the corresponding process will provide a less electrolytic efficiency because of poor solubility of these ammonia compounds in water, so that the modified process is unfavorable, although it is practicable.

It is a commonly known fact, that a halide such as titanium halide or hydrogen halide is electrolytically dissociated in the form of $H_2^{2+}[TiX_6]^{2-}$. It is supposed that ammonia compounds of titanium chloride formed in the first stage of the process according to the invention seem to be dissociated in the form of:

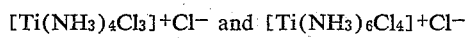

When the reaction products in the first reaction stage are then subjected to an electrolytic operation, it is clearly observed that chlorine gas is separated at the anode, while ammonia gas generates at the cathode. It is supposed in this case, that the dissolved constituents of the bath in the second reaction stage according to the invention vary as follows:

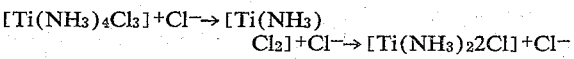

and $\rightarrow [Ti(NH_3)]^+Cl^-$ to a lesser degree.

In practice, no precipitation of the oxide or oxychloride of titanium was observed, neither in an aqueous solution of $TiCl_4 \cdot 4NH_3$ or $TiCl_4 \cdot 6NH_3$, the reaction products of titanium tetrachloride with ammonia gas, nor in the electrolytic products according to the second reaction process of the invention.

Further it was observed that the residuals or black powder obtained by the distillation of said reaction liquid subjected to the complete electrolytic operation had, on the average, perfectly a composition of $TiCl_2$, showing practically no content of oxygen and the like. This fact differs completely from the commonly known reactivity of titanium dichloride with water. It was further obsserved, that when the thus obtained titanium dichloride was brought to contact with moist air, white powder of titanium oxide was gradually formed on the surfaces. From these observations, it may be easily supposed that the titanium dichloride is prevented from hydrolysis by the presence of ammonia united therewith, during the time interval from the end of said electrolysis to the final stage of said distillation treatment. Thus, in the present process, the ammonia compound of titanium tetrachloride is highly stable in water at normal temperature, so that when the ammonia compound is subjected to reduced pressures the water content thereof is substantially discharged therefrom, by evaporation, and then, the residual water content can be almost perfectly separated from the compound at higher temperatures and at further reduced pressures, the temperatures being preferably less than about 70° C.

As above stated, in the first reaction stage, an inert and non-water-soluble solvent is used. As the solvent, one or more solvents selected from the group of aromatic hydrocarbons or petroleum hydrocarbons may be employed.

In the electrolysis, also the second reaction stage of the invention, mercury is normally used as the cathode. Other suitable material such as nickel, cobalt, chromium, lead or their alloys may be employed. As the anode, a carbon electrode is most recommended. The current densities are preferably 5–40 amp./dm.$^2$ for the anode and 5–30 amp./dm.$^2$ for the cathode.

The above and further objects and novel features of the present invention will more fully appear from the following several examples. It is to be expressly under-

Example 1

51.57 gr. (30 cc.) of titanium tetrachloride was introduced in a 100 cc. flask provided with four branches, which are connected with a thermometer, an ammonia gas inlet, a sealed agitator and a gas-outlet with reflux condenser, respectively, the lower end of the gas inlet pipe being arranged at a height slightly higher than the liquid level of the tetrachloride. Dry ammonia gas is then introduced into the reaction vessel to react with the chloride, the temperature, at which the reaction began, being 35° C. With continuous supply of ammonia gas, the temperature rose rapidly to 50–65° C. The reaction temperature was so controlled that it did not rise over 65° C., by cooling the vessel with water from outside, as well as by regulating the supply quantity of ammonia gas, the proper rate of which amounted to 28.12 gr. per hour. The reaction continued about for an hour, because, if extended beyond the time interval, substantial quantity of paste-like reaction product would form, leading to a decrease in the yield. Next, the sealed agitator was replaced by a tight plug, and the reflux condenser by normal one. Then, the reaction product in the vessel was subjected to a distillation at reduced pressures and at a temperature of about 35° C. to separate unreacted tetrachloride and to dry the product. Thus, 42.8 gr. of red brown $TiCl_4 \cdot 4NH_3$ was obtained with a yield of 61.1%.

Example 2

51.57 gr. (30 cc.) of titanium tetrachloride was mixed with 70 cc. of benzene and then introduced in a 200 cc. flask arranged in similar way as in the previous example. Further operation was carried out as in the case of the preceding example. Thus, 59 gr. of $TiCl_4 \cdot 4NH_3$ was obtained with a yield of 85%.

Example 3

Some quantity of mercury was introduced in a 50 cc. glass-made electrolytic cell to form the cathodic electrode, said cell being provided with a discharge cock at the bottom. 60 gr. of the ammonia compound of titanium tetrachloride obtained according to either of preceding examples was added to water to 100 cc., and filtered to separate a small quantity of suspended particles therefrom. Then, 50 cc. of the filtrate was charged, to form the electrolyte, in the cell, which was then covered with a cover, through the latter passing a round glass bar, which was provided with a fused-in core of finer platinum wire and the lower end of which was brought to contact with the mercury cathode. In addition, through said cover plate passed a glass cylinder, the bottom of which was made in the form of a glass filter, the inner space of said cylinder serving as the anodic chamber. The glass cylinder was sealed by a rubber cover at the upper end, through the latter passing a graphite anode as well as an outlet pipe for generated chlorine gas, while said cover plate was provided with an outlet for ammonia gas. With this arrangement, the electrolyte was subjected to electrolysis at a temperature of 20° C. for about four hours. The surface area of the mercury was 16.61 cm.$^2$, while the wet periphery amounted to 19.00 cm.$^2$. The distance between anode and cathode was 1 cm., and the current densities amounted to 5.25 amp./cm.$^2$ for anode and to 6.002 amp./dm.$^2$ for cathode. In the course of the electrolytic operation, the color of the liquid changed from light green to purple, dark purple and finally to black. At about four hours of duration, black powder began to settle down at the mercury surface. When this was observed, the discharge cock was opened and the liquid together with mercury was discharged from the cell to a receiver. The liquid was separated from mercury and then dried at a vacuum of 12 mm. Hg for about thirty minutes. Thus, 12.61 gr. of $TiCl_2$ was obtained with a yield of 91%.

Having thus described the invention, what is claimed as new and desired to be secured by Letters Patent is:

1. The method of producing titanium dichloride from titanium tetrachloride, comprising the steps of passing dry ammonia gas through and in direct-reacting contact with liquid titanium tetrachloride to thereby form titanium tetramminotetrachloride, dissolving said titanium tetramminotetrachloride in water, electrolyzing the resultant aqueous solution to form the desired titanium dichloride, and subjecting the liquid containing said titanium dichloride to vacuum distillation for removing ammonia and water from said liquid.

2. The method of producing titanium dichloride, comprising the steps of contacting in direct-reacting relationship titanium tetrachloride with dry ammonia gas to form an amminotetrachloride of titanium, dissolving said amminotetrachloride of titanium in water, electrolyzing the resultant aqueous solution to form the desired titanium dichloride, and subjecting the liquid containing said titanium dichloride to vacuum distillation for removing ammonia and water from said liquid.

3. The method of producing titanium dichloride, comprising the steps of bringing dry ammonia gas into direct-reacting relationship with titanium tetrachloride in the presence of an inert and water-insoluble solvent to thereby form an amminotetrachloride of titanium, dissolving said amminotetrachloride of titanium in water, electrolyzing the resultant aqueous solution to form the desired titanium dichloride, and subjecting the liquid containing said titanium dichloride to vacuum distillation for removing from said liquid ammonia and water.

4. The method of producing titanium dichloride, comprising the steps of contacting substantially pure titanium tetrachloride with dry ammonia gas at a temperature lower than 65° C. to effect a direct reaction therebetween so as to form an amminotetrachloride of titanium, dissolving said amminotetrachloride of titanium in water, electrolyzing the resultant aqueous solution to obtain a liquid containing the desired titanium dichloride, and subjecting said liquid to vacuum distillation at a temperature lower than 70° C. for removing ammonia and water from said liquid.

5. The method of producing titanium dichloride, comprising the steps of passing dry ammonia gas through and in direct-reacting contact with substantially pure titanium tetrachloride in the presence of an inert, water-insoluble solvent at a temperature less than 65° C. to thereby form an amminotetrachloride of titanium, subjecting the reaction liquid to reduced pressures at a temperature less than 65° C. to separate said solvent and any unreacted titanium tetrachloride from said amminotetrachloride of titanium, dissolving said amminotetrachloride of titanium in water, electrolyzing the resultant aqueous solution to form the desired titanium dichloride, and subjecting the liquid containing said titanium dichloride to vacuum distillation at a temperature less than 70° C. for removing from said last-named liquid ammonia and water.

6. The method of claim 5, wherein said solvent is selected from the group consisting of benzene, toluene and xylene.

7. The method of claim 5, wherein said amminotetrachloride of titanium is dissolved in sufficient water to obtain a 30–70% solution, the electrolysis of said aqueous solution being carried out at a temperature between −15° C. and 40° C.

8. The method of claim 7, wherein a graphite anode and a mercury cathode are employed for effecting said electrolysis.

9. The method of claim 8, wherein the current density for said anode is maintained between 5 and 40 amp./dm.$^2$, while the current density for said cathode is maintained between 5 and 30 amp./dm.$^2$.

References Cited in the file of this patent

UNITED STATES PATENTS 723,217  Spence _____ Mar. 17, 1903

OTHER REFERENCES

Mellor: "Comprehensive Treatise on Inorganic and Theoretical Chemistry," vol. 7 (1927), pp. 83 and 84.